(12) United States Patent
Llamazares Domper et al.

(10) Patent No.: US 11,590,914 B1
(45) Date of Patent: Feb. 28, 2023

(54) SAFETY SYSTEMS FOR MODULAR SEATING

(71) Applicants: Arturo Llamazares Domper, San Jose, CA (US); Adam J. Golman, San Jose, CA (US); Nicholas A. White, Sunnyvale, CA (US); Jesse T. Buehler, Portola Valley, CA (US)

(72) Inventors: Arturo Llamazares Domper, San Jose, CA (US); Adam J. Golman, San Jose, CA (US); Nicholas A. White, Sunnyvale, CA (US); Jesse T. Buehler, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/316,846

(22) Filed: May 11, 2021

Related U.S. Application Data

(60) Provisional application No. 63/024,038, filed on May 13, 2020.

(51) Int. Cl.
*B60R 21/16* (2006.01)
*B60R 21/0134* (2006.01)
*B60N 3/00* (2006.01)

(52) U.S. Cl.
CPC .......... *B60R 21/0134* (2013.01); *B60N 3/001* (2013.01); *B60R 21/16* (2013.01)

(58) Field of Classification Search
CPC ................................................. B60R 21/0134
See application file for complete search history.

(56) References Cited

U.S. PATENT DOCUMENTS

| | | | |
|---|---|---|---|
| 4,787,541 | A | 11/1988 | Pollard |
| 9,295,325 | B2 | 3/2016 | Luebke et al. |
| 9,834,121 | B2 | 12/2017 | Riefe |
| 10,336,275 | B2 | 7/2019 | Sundararajan et al. |
| 2019/0291678 | A1 | 9/2019 | Cho et al. |

(Continued)

FOREIGN PATENT DOCUMENTS

WO 2020/020504 A1 1/2020

OTHER PUBLICATIONS

Brown, D., "Tables, footrests, smart speakers: Self-driving cars could become the living rooms of the future", USA Today, BMW, Nissan, GM: Smart car interiors to become posh living rooms, www.usatoday.com/story/money/cars, Feb. 2020 (5 pp).

(Continued)

*Primary Examiner* — Barry Gooden, Jr.
(74) *Attorney, Agent, or Firm* — Young Basile Hanlon & MacFarlane, P.C.

(57) ABSTRACT

A safety system for a vehicle includes a work table, an airbag, and a controller that includes a processor. The work table is disposed in an extended position and is movable to a reaction position and a stowed position. The processor is configured to receive information indicative of a vehicle event. The processor is further configured to send a command to deploy the airbag based on the information indicative of the vehicle event. When deployed, the airbag expands to abut a bottom surface of the work table and move the work table from the extended position to the reaction position such that the bottom surface of the work table in the reaction position serves as a reaction surface for the airbag.

20 Claims, 6 Drawing Sheets

(56) References Cited

U.S. PATENT DOCUMENTS

2019/0315303 A1 10/2019 Kia et al.
2020/0055481 A1* 2/2020 Mimura .............. B60R 21/0134

OTHER PUBLICATIONS

McDonald, G., "Up next: self-driving offices", https://medium.com/cxo-magazine/up-next-self-driving-offices, Nov. 2017, CXO Magazine—Medium (9 pp).
Davies, C., "Six Volvo 360c features we really need in production cars", www.slashgear.com/volvo-360c-6-autonomous-ev-concept-features, Slashgear, Sep. 2018 (16 pp).
Weiss, C.C., "Panasonic's autonomous car cabin sits you at an interactive display table", https://newatlas.com/panasonic-autonomous-cabin-concept/, New Atlas, Jan. 2017 (10 pp).

* cited by examiner

SAFETY SYSTEMS FOR MODULAR SEATING

CROSS-REFERENCE TO RELATED APPLICATIONS

This application claims priority to U.S. Provisional Application Ser. No. 63/024,038, filed May 13, 2020, entitled "Safety Systems for Modular Seating," the contents of which are incorporated herein by reference.

TECHNICAL FIELD

This disclosure relates generally to safety systems and specifically to airbags and other motion-control devices configured to control motion of an occupant seated in a variety of positions within a modular seating system.

BACKGROUND

A passenger vehicle can leverage interior surfaces in a vehicle cabin to serve as airbag reaction surfaces. For example, a dashboard, a dash panel, a windshield, or combinations thereof can serve as a reaction surface for an airbag that deploys from the vehicle dash panel or from a steering wheel during a vehicle event such as a collision to prohibit an occupant from impacting these (or other) structures. In another example, the dashboard or a dash panel can serve as a reaction surface for a knee bolster that deploys from a dash panel or a steering column into a foot well in order to reduce pelvis excursion.

In modular seating systems, such as in a vehicle with modular interior elements including seat systems that can be arranged into a configuration consistent with the vehicle cabin serving as a mobile office or a living room, traditional reaction surfaces such as dashboards, dash panels, and foot wells may not be present to serve as reaction surfaces for airbags. New safety system designs are thus required to protect occupants during vehicle events.

SUMMARY

In a first aspect, the disclosure describes a safety system for a vehicle including a work table, an airbag, and a controller that includes a processor. The work table is disposed in an extended position and is movable to a reaction position and a stowed position. The processor is configured to receive information indicative of a vehicle event. The processor is further configured to send a command to deploy the airbag based on the information indicative of the vehicle event. When deployed, the airbag expands to abut a bottom surface of the work table and move the work table from the extended position to the reaction position such that the bottom surface of the work table in the reaction position serves as a reaction surface for the airbag.

In the first aspect, the processor can be further configured to receive information indicative of the stowed position for the work table and send a command to cause movement of the work table from the stowed position to the extended position based on the information indicative of the vehicle event and the stowed position for the work table. The safety system can further comprise a table release mechanism configured to prohibit movement of the work table in a locked configuration and allow movement of the work table in an unlocked configuration. The processor can be further configured to send a command to the table release mechanism to move from the locked configuration to the unlocked configuration to allow movement of the work table between the extended position and the reaction position based on the information indicative of the vehicle event and the information indicative of the extended position of the work table.

In the first aspect, the safety system can include a seat system and the processor can be further configured to receive information indicative of a rearward position for a seat in the seat system. The seat can have a forward position proximate to the work table and the rearward position spaced from the work table. The processor can be further configured to send a command to a seat release mechanism to move from a locked configuration to an unlocked configuration to allow movement of the seat based on the information indicative of the vehicle event, the extended position of the work table, and the rearward position of the seat. The processor can be further configured to send a command to a seat motion-control device configured to cause movement of the seat from the rearward position to the forward position based on the information indicative of the vehicle event, the extended position of the work table, and the rearward position of the seat.

In the first aspect, the safety system can include a seat energy-absorbing (EA) device configured to control movement of the seat between the rearward and forward positions. The seat EA device can include an EA element configured to deform above a predetermined load threshold to control movement of the seat between the rearward and forward positions. The EA element can be a series of notch elements spaced along a longitudinal axis of a seat guide. The seat EA device can be a cable coupled to the seat and configured to payout from a cable guide above a predetermined load threshold to control movement of the seat along a seat guide. The cable guide can include a spool and torsion bar configured to control payout of the cable along the seat guide. The cable can include a ductile strip and the cable guide can include barriers configured to deform the ductile strip to control payout of the ductile strip along the seat guide. The features described in respect to the first aspect can be used together or independently in the safety system.

In a second aspect, the disclosure describes a method that includes receiving information indicative of an imminent collision for a vehicle and determining that a work table in the vehicle is in an extended position. The work table has a stowed position, the extended position, and a reaction position. The method also includes sending a command to deploy an airbag of the vehicle in response to receiving the information indicative of the imminent collision and determining that the work table is in the extended position. The work table is configured to move from the extended position to the reaction position based on expansion of the airbag so that a bottom surface of the work table in the reaction position serves as a reaction surface for the airbag.

In the second aspect, the method can include determining that the work table is in the stowed position and sending a command to cause movement of the work table from the stowed position to the extended position in response to determining that the work table is in the stowed position and in response to receiving the information indicative of the imminent collision. The method can include determining that a seat associated with the work table is in a rearward position. The seat can have a forward position proximate to the work table and the rearward position spaced from the work table. The method can include sending a command to a seat release mechanism to move from a locked configuration to an unlocked configuration to allow movement of the seat in response to determining that the seat is in the rearward position and that the work table is in the extended position. The method can include sending a command to a seat motion-control device to cause movement of the seat from the rearward position to the forward position in response to determining that the seat is in the rearward position and that the work table is in the extended position. The method can include sending a command to a seat energy-absorbing (EA) device to control movement of the seat between the rearward and forward positions. The features described in respect to the second aspect can be used together or independently in the method.

In a third aspect, the disclosure describes a safety system for a vehicle that includes a work table disposed in an extended position and movable to a reaction position and a stowed position, a seat disposed in a rearward position spaced from the work table and movable to a forward position proximate to the work table, and an airbag disposed in a stowed position under the work table and expandable to a deployed position abutting a bottom surface of the work table. The safety system includes a controller having a processor configured to send a command to deploy the airbag upon receiving information indicative of a vehicle event and send a command to move the seat from the rearward position to the forward position upon receiving the information indicative of the vehicle event. In the third aspect, the airbag moves the work table from the extended position to the reaction position such that the bottom surface of the work table in the reaction position serves as a reaction surface for the airbag.

In the third aspect, the processor can be configured to send a command to a seat release mechanism to move from a locked configuration to an unlocked configuration to allow movement of the seat from the rearward position to the forward position. The processor can be configured to send a command to a seat motion-control device to cause movement of the seat from the rearward position to the forward position. The safety system can include a seat energy-absorbing (EA) device configured to control movement of the seat between the rearward and forward positions. The seat EA device can include an EA element configured to deform above a predetermined load threshold to control movement of the seat between the rearward and forward positions. The features described in respect to the third aspect can be used together or independently in the safety system.

DETAILED DESCRIPTION

In the safety systems described herein, an airbag is used with novel reaction surfaces including a work table movable between a stowed position, an extended position, and a reaction position. When deployed, the airbag can expand to abut or interface with a bottom surface of the work table and move the work table from the extended position to the reaction position to provide a reaction surface for the airbag. In addition, the safety system can include a seat system with a seat movable between a forward position proximate to the work table and a rearward position spaced from the work table. The seat can be movable between the rearward position and the forward position based on the position of the work table prior to or during deployment of the airbag to better position an occupant with respect to the airbag. In the event that the work table is absent or stowed, additional or alternate reaction surfaces can be deployed for use with the airbag.

Figure 1:
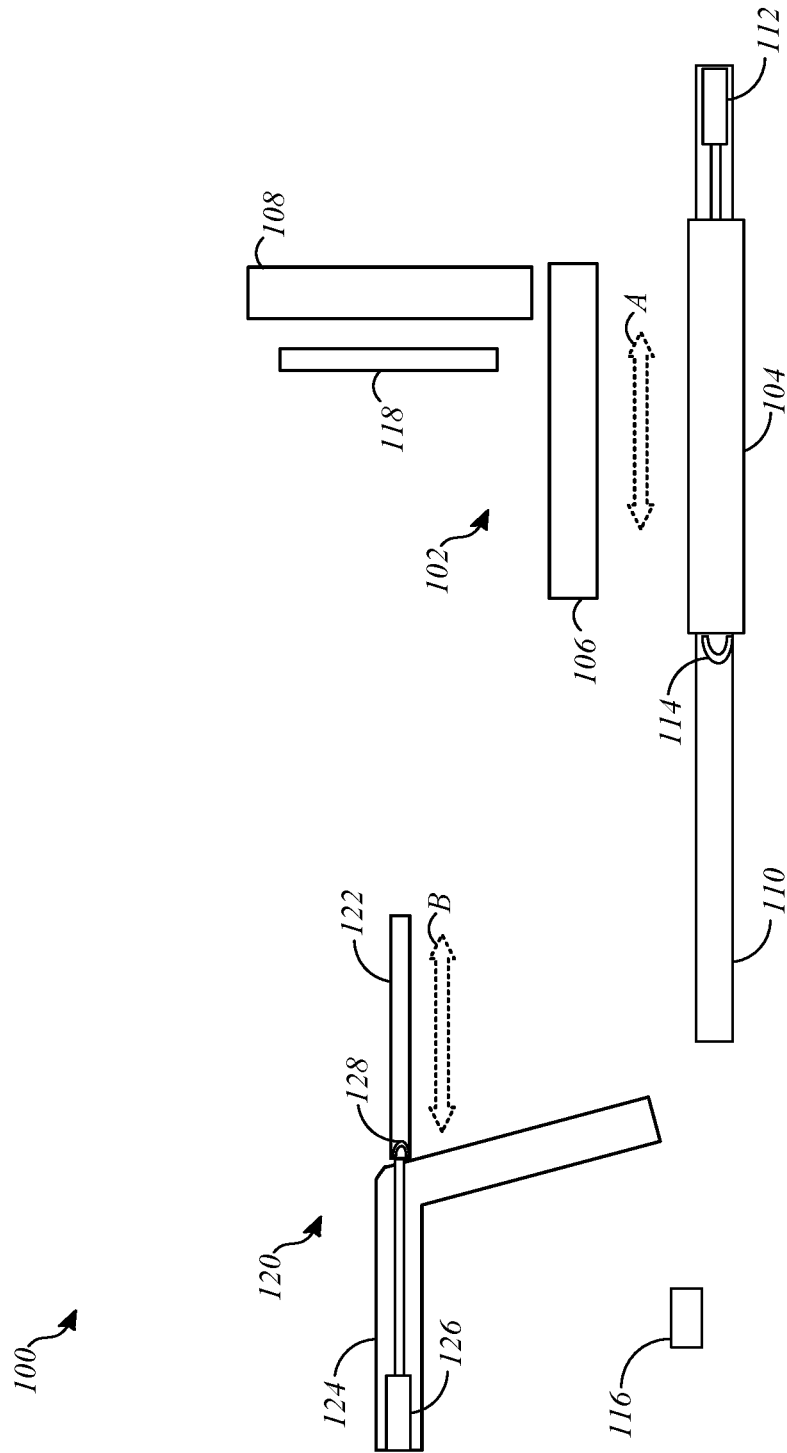
FIG. 1 is a schematic representation of a vehicle cabin including modular interior elements.

FIG. 1 is a schematic representation of a vehicle cabin 100 including several modular interior elements. The vehicle cabin 100 includes a seat system 102 having a seat base 104 to support a seat pan 106 and a seat back 108 that is rotatable with respect to the seat pan 106. The seat base 104 is movable along a seat guide 110, in this example, in a fore-aft direction (e.g., an X direction) within the vehicle cabin 100 as shown by dotted-line arrow A. The seat guide 110 can control movement of the seat base 104 using rails, tracks, electromagnets, or any other suitable mechanism.

The seat system 102 can include a seat motion-control device 112 associated with the seat guide 110 and designed to effectuate controlled motion of the seat base 104, and hence the supported seat pan 106 and seat back 108, with respect to the seat guide 110 as shown by the dotted-line arrow A. The seat guide 110 is designed to allow an extended length of fore-aft direction travel, for example, across a larger portion or an entirety of the vehicle cabin 100 as compared to more traditional vehicles with limited travel.

The seat system 102 can also include a seat release mechanism 114 associated with the seat guide 110 and the seat base 104. Both the seat motion-control device 112 and the seat release mechanism 114 can receive signals or information from a controller 116 indicative of prohibiting, allowing, or otherwise controlling movement of the seat base 104 along the seat guide 110. For example, the controller 116 can send a signal to the seat release mechanism 114 that commands the seat release mechanism 114 to switch from a locked configuration where movement of the seat base 104 along the seat guide 110 is prohibited to an unlocked configuration where movement of the seat base 104 along the seat guide 110 is allowed. Movement of the seat base 104 can be effected by the seat motion-control device 112 or by motion of the vehicle.

The seat system 102 also includes a restraint 118 for use in securing an occupant (not shown) to the seat pan 106 and the seat back 108. The restraint 118 can be coupled to an anchor (not shown) and include a lap portion and a shoulder portion (not shown). The restraint 118 may include additional anchors (not shown), be coupled to one or more buckles (not shown) to secure and release the restraint 118, or be coupled to one or more retractors (not shown) that control payout of the restraint 118 during various vehicle events.

The vehicle cabin 100 of FIG. 1 also includes a table system 120. The table system 120 includes a work table 122 for use by an occupant within the vehicle cabin 100, for example, to hold a laptop, book, mobile device, journal, drink, or other personal paraphernalia. The work table 122 is movable along, within, or about a table guide 124, and in this example, the work table 122 is movable in a fore-aft direction (e.g., an X direction) with respect to the table guide 124 as indicated with dotted-line arrow B. The table guide 124 can guide or control movement of the work table 122 using rails, tracks, electromagnets, or any other suitable mechanism.

The table system 120 can also include a table motion-control device 126 associated with the work table 122 and the table guide 124 and designed to effectuate the controlled motion of the work table 122 with respect to the table guide 124 as shown by the dotted-line arrow B. The table system 120 can also include a table release mechanism 128 associated with the table guide 124 and the work table 122. The table release mechanism 128 can have a locked configuration prohibiting motion of the work table 122 and an unlocked configuration allowing motion of the work table 122. Both the table motion-control device 126 and the table release mechanism 128 can receive signals or information from the controller 116 indicative of prohibiting, allowing, or otherwise controlling movement of the work table 122 along, about, or with respect to the table guide 124.

In the example of FIG. 1, the work table 122 is shown in an extended position outwardly extending from the table guide 124. The work table 122 can also retract into the table guide 124 in a stowed position (not shown) when the occupant is not using the work table 122. The seat system 102 is shown in a rearward position that is spaced from the work table 122 in FIG. 1. The term "spaced from" is used to indicate that an occupant using the seat system 102 is sufficiently far from the work table 122 so that use of the work table 122 may be inconvenient. To effect repositioning, the controller 116 can send a signal to the table motion-control device 126 to deploy the work table 122 to extend from the table guide 124 or to stow the work table 122 within the table guide 124. In another example, the controller 116 can send a signal to the table release mechanism 128 to allow (e.g., in the unlocked configuration) or prohibit (e.g., in the locked configuration) manual or passive storage, deployment, or rotation of the work table 122 with respect to the table guide 124, for example, by manual occupant control.

Figure 2:
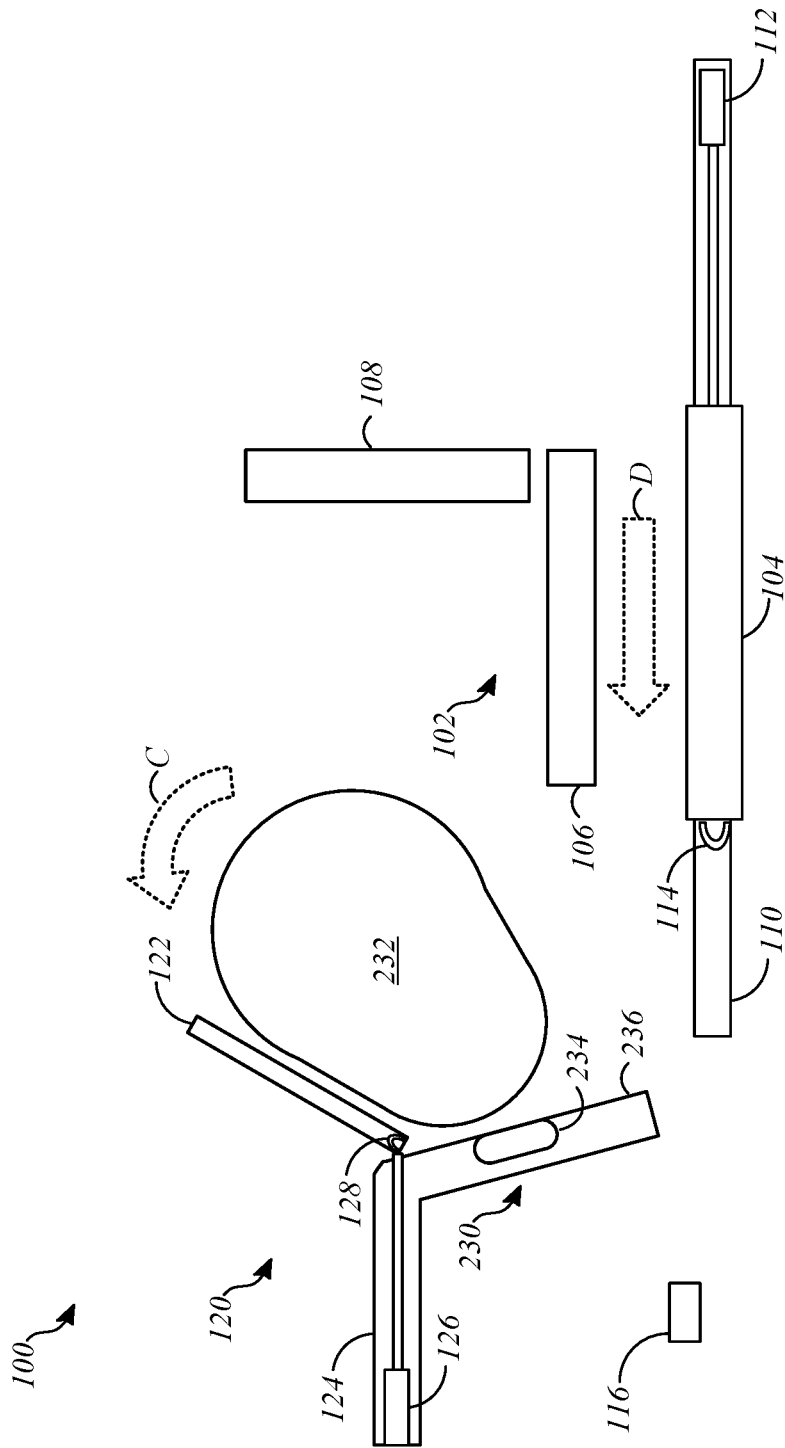
FIG. 2 shows a motion diagram for an example of an airbag system interacting with the modular interior elements of FIG. 1.

FIG. 2 is a schematic representation of an airbag system 230 interacting with the modular interior elements of the seat system 102 and the table system 120 in the vehicle cabin 100 of FIG. 1. The airbag system 230 includes an airbag 232 deployable from a position below the work table 122. The airbag system 230 also includes airbag storage 234, for example, airbag packaging and inflation mechanisms (not shown), that are stowed or stored proximate to or within an interior surface 236 of the vehicle cabin 100. The interior surface 236 can be a side wall, a front wall, a foot rest, a door panel, or any other interior surface of the vehicle cabin 100.

The airbag 232 is shown in a deployed position, having expanded from a stowed position within the airbag storage 234 under the work table 122, abutting or pushing against a bottom surface of the work table 122, then moving the work table 122 from the extended position into a reaction position where the work table 122 serves as a reaction surface for the airbag 232. This motion is indicated with dotted-line arrow C, with the airbag 232 expanding from below the work table 122 and rotating the work table 122 up and about a pivot (proximate to a location of the table release mechanism 128, but not shown) with respect to the table guide 124, until the work table 122 is both clear of an occupant (as the occupant may be moving forward) and situated in the reaction position as shown to offer an additional reaction surface for the airbag 232. In the example of FIG. 2, both the interior surface 236 of the vehicle cabin 100 and the bottom surface of the work table 122 serve as reaction surfaces for the airbag 232 once deployed.

The airbag system 230 can be an adaptive airbag system (e.g., with a multi-stage or a multi-chamber airbag 232) to enable occupant contact with the airbag 232 to be optimally timed and to better control movement of the occupant. The vehicle cabin 100 can also include advanced sensors/cameras (not shown) to determine proper timing for the airbag 232 to deploy depending on various aspects of a vehicle event, such as severity, location, speed, time to imminent collision, occupant size, occupant mass, position of the seating system 102, restraint usage, etc. The vehicle event can be a rapid deceleration, an imminent or ongoing collision, or other event sufficient to cause airbag deployment as determined, for example, by the advanced sensors/cameras.

The types of sensors employed can be varied and can communicate information to the controller 116. For example, the sensors can include sensors configured to capture information from an external environment outside of the vehicle cabin. External-sensing sensors can includes technologies such as radar, LIDAR, imaging, infrared, or other technologies configured to detect potential vehicle events such as imminent collisions and provide information to the controller 116 to allow a determination of timing of the vehicle event. The sensors can also include sensors internal to the vehicle cabin 100 such as weight sensors, buckle switch sensors, internal cameras, seat position sensors, work table position sensors, imaging sensors, etc. that can provide information to the controller 116 to allow determinations to be made for positioning and deployment timing for the airbag system 230.

FIG. 2 shows the seat system 102 in a forward position as compared to the rearward position shown in FIG. 1, that is, the seat system 102 has moved forward in the vehicle cabin 100 to be proximate to the work table 122 as indicated by dotted-line arrow D. By controlling seat stroke, that is, fore-aft movement of the seat system 102 within the vehicle cabin 100, proper positioning of the occupant with respect to the airbag 232 is possible. The term "proximate" is used to indicate that the seat system 102 is sufficiently close to the work table 122 to allow an occupant to use the work table 122.

Movement of the seat base 104 along the seat guide 110 to position the seat system 102 with respect to the airbag system 230 may be needed when a distance between the two systems is either below or above a predetermined distance threshold. The predetermined distance threshold can be selected to optimize performance of the airbag 232 with respect to the occupant, either restrained or unrestrained. Movement of the seat base 104 can be caused by inertia during the vehicle event, controlled by the seat motion-control device 112, or controlled by a combination thereof. Movement of the occupant and the seat system 102 toward (or away from) the airbag 232 prior to or during a vehicle event such as an imminent collision can improve efficiency of the airbag 232.

As shown in FIG. 2, moving the seat base 104 forward toward the airbag 232 as shown by the dotted-line arrow D prior to or during a front-end vehicle event can prevent an unrestrained occupant from slipping, sliding, or falling off of the seat pan 106 or the seat back 108 while also bringing the occupant closer to the airbag 232 to improve efficiency of the airbag 232. Though examples herein describe a forward-facing seat system 102 and a front-end airbag system 230, the same components in alternate positions can be used in combination with rearward-facing occupants and/or rear-end vehicle events.

In an example of safety system operation for a front-end vehicle event with a forward-facing occupant, the controller 116 can send a signal to the table release mechanism 128 to change from a locked configuration to an unlocked configuration in order to allow the work table 122 to rotate upward with respect to the table guide 124 in response to information indicative of a vehicle event such as an imminent collision to prepare the work table 122 to serve as a reaction surface for the airbag 232. Rotation of the work table 122 can be controlled by expansion of the airbag 232, or, for example, implemented using the table motion-control device 126. The controller 116 can also send a signal to the seat release mechanism 114 to move to the unlocked configuration so that the seat base 104 is movable with respect to the seat guide 110. The seat base 104 (and thus the seat pan 106 and the seat back 108) can be configured to move toward the work table 122 and the airbag 232 in response to information indicative of a vehicle event. Movement of the seat base 104 can be effectuated by motion of the vehicle, or, for example, implemented or controlled using the seat motion-control device 112. In some examples, the motion-control device 112 can include an energy-absorbing (EA) device to decrease a severity of a pulse experienced by a restrained occupant during the vehicle event while also bringing the occupant closer to the airbag 232.

FIGS. 3-6 show motion diagrams for examples of EA devices for use with the motion-control devices 112, 126 shown and described in FIGS. 1 and 2. The EA devices can be used to dampen movement during a vehicle event such as an imminent collision and can serve as part of or be otherwise associated with the motion-control devices 112, 126.

Figure 3:
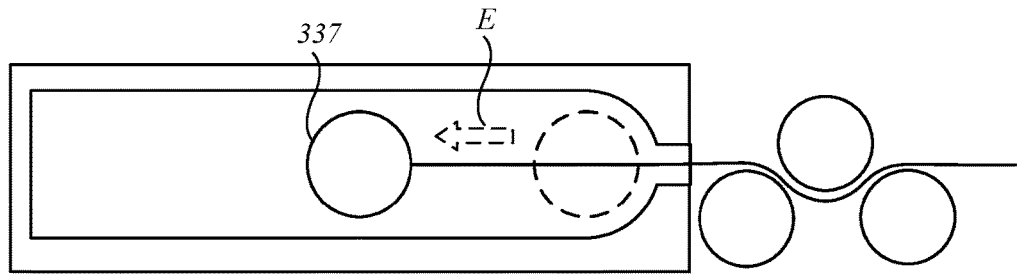
FIGS. 3-6 show motion diagrams for examples of energy-absorbing (EA) devices.

FIG. 3 shows a bending bar EA device with a ductile strip that is attached to an anchor point 337 and routed through a series of barriers which plastically deform the ductile strip, generating a tunable force threshold for payout of the ductile strip, with payout of the anchor point 337 indicated using a dotted-line arrow E. In other words, deformation of the ductile strip will slow or dampen motion of the anchor point 337.

Figure 4:
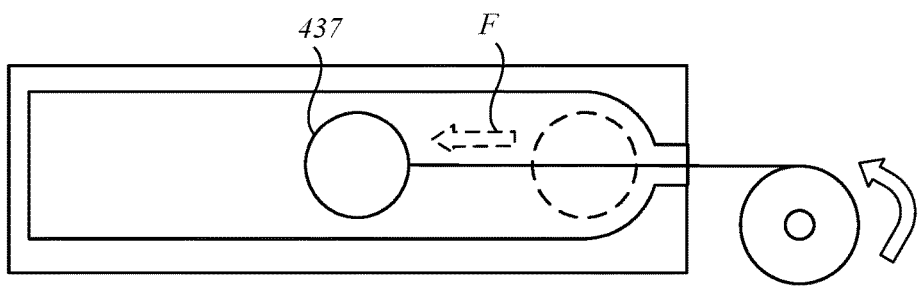

FIG. 4 shows a cable or other tension carrying member that is attached to an anchor point 437 and coiled around a spool with a torsion bar that controls a tunable force threshold for payout, with payout of the anchor point 437 indicated using a dotted-line arrow F. In other words, the cable or tension carrying member will begin to unwind from the spool to support motion of the anchor point 437. In FIGS. 3 and 4, motion of the anchor points 337, 437 can be configured to occur after the tunable force threshold is met. The EA devices of FIGS. 3 and 4 may be suitable for use with the seat motion-control device 112 to control motion of the seat system 102 during a vehicle event.

Figure 5:
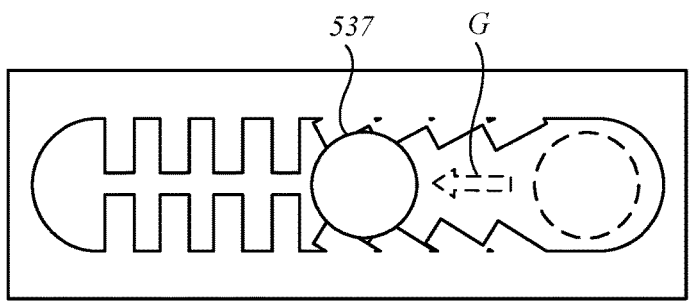

FIG. 5 shows a ladder-type EA device having notches configured to support a tunable force threshold in that the notches withstand a predetermined amount of force from an anchor point 537 prior to undergoing compression or bending. In this manner, the notches control movement of the anchor point 537. Motion of the anchor point 537 is indicated using a dotted-line arrow G. In other words, the anchor point 537 will move from notch to notch as subsequent notches compress or bend under force from the anchor point 537.

Figure 6:
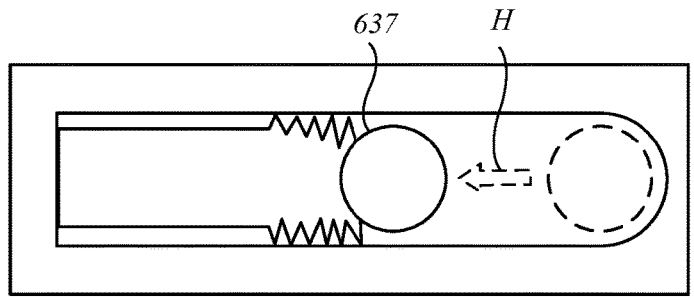

FIG. 6 shows a deformable element such as a honeycomb or extruded member with a tunable force threshold so that the deformable element controls movement of an anchor point 637. Motion of the anchor point 637 is indicated using a dotted-line arrow H. In other words, the anchor point 637 will exert force against the deformable element to cause crushing or bending above the tunable force threshold. Motion of the anchor points 537, 637 can occur after the tunable force threshold is met. The EA devices of FIGS. 5 and 6 may be suitable for use with the seat motion-control device 112 or the table motion-control device 126 during a vehicle event.

Figure 7:
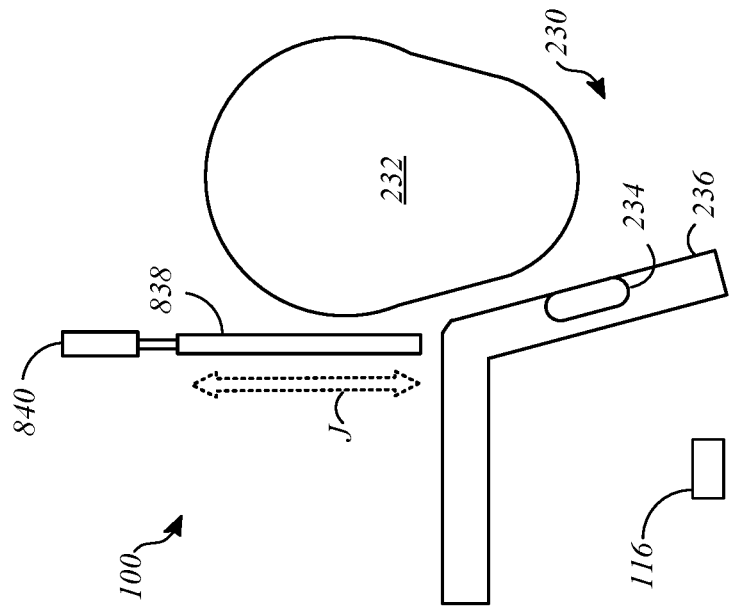
FIGS. 7-8 show motion diagrams for examples of additional reaction surfaces for use with the airbag system of FIG. 2.
Figure 8:
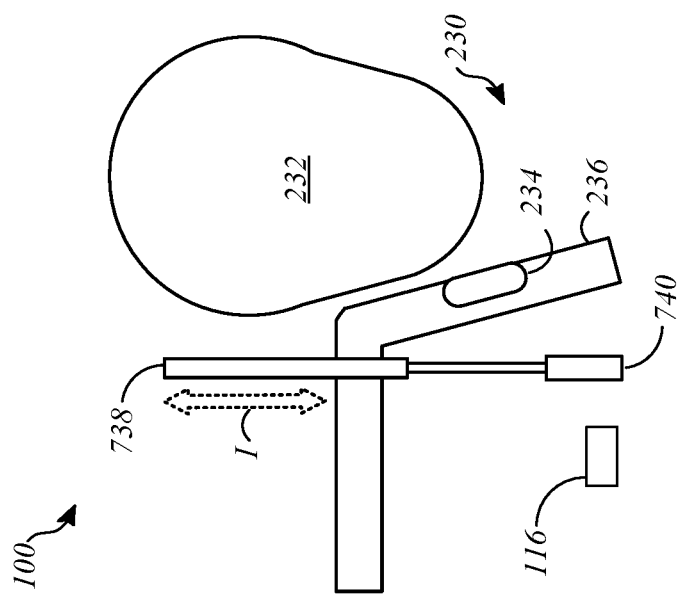

FIGS. 7 and 8 show motion diagrams for examples of reaction surfaces 738, 838 for use with the airbag system 230 of FIG. 2. For simplicity, the seat system 102 is not shown, though operation of the seat system 102 is compatible with use of the reaction surfaces 738, 838, for example, when the work table 122 (FIGS. 1 and 2) is absent or in a stowed position. In other words, the reaction surfaces 738, 838 can serve to support and position the airbag 232 as deployed from the airbag storage 234 proximate to or disposed within the interior surface 236 of the vehicle cabin 100 in situations where the work table 122 (FIGS. 1 and 2) is absent or is in a stowed position prior to a vehicle event such as an imminent collision.

The reaction surfaces 738, 838 can be formed from flat, table-like structures or can include extendable, bendable, or rotatable arms with mesh, netting, foldable or rollable materials, stretchable materials, or other deformable and stowable materials extending between the arms. The reaction surfaces 738, 838 are configured for storage proximate to and deployment into the vehicle cabin 100. In the example of FIG. 7, the reaction surface 738 is configured for storage proximate to the interior surface 236 and is movable to an extended position as shown by a dotted-line arrow I. In the example of FIG. 8, the reaction surface 838 is configured for storage proximate to a roof or pillar (not shown) proximate to the vehicle cabin 100 and is movable to an extended position as shown by a dotted-line arrow J.

Various mechanisms can receive commands from the controller 116 to effect motion of the work table 122, the seat base 104, and the reaction surfaces 738, 838. For example, motion-control devices 112, 126, 740, 840 may be configured as one or more of an electromechanical device, a pneumatic device, and/or a pre-tensioned spring device. The electromechanical device can include an electric motor, a threaded rod, and a threaded guide coupled to a sensor module (not shown) to receive commands from the controller 116. The pneumatic device can include pressurized gas (or a vacuum) configured to effect movement of a piston (not shown) based on a command from the controller 116. The pre-tensioned spring device can include a spring that is coupled to a sensor module (not shown). The spring can be held in tension until being selectively released, for example, based on a command from the controller 116. The motion-control devices 112, 126, 740, 840 can also control movement using other mechanisms such as telescoping systems, folding systems, cable or tether systems, or track-based systems.

Figure 9:
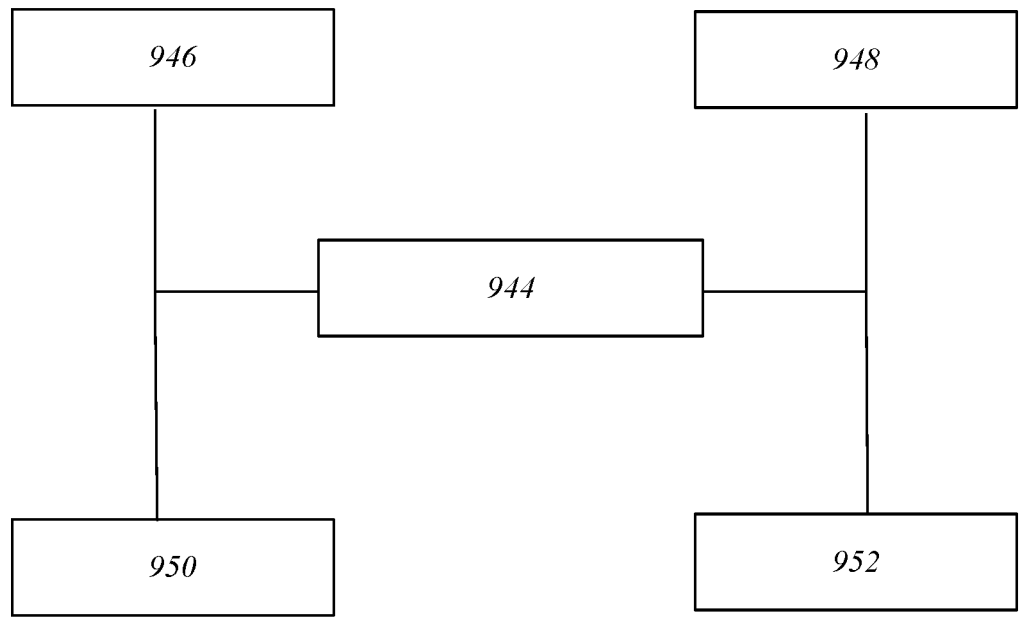
FIG. 9 is a block diagram of a safety system.

FIG. 9 is a block diagram that shows a safety system 942. The safety system 942 can include a controller 944, sensors 946, a seat system 948, a reaction system 950, and an airbag system 952. The safety system 942 can include components similar to components described in reference to FIGS. 2A-7. For example, the seat system 948 can operate in a manner similar to the seat system 102 of FIGS. 1-2. The reaction system 950 can operate in a manner similar to the table system 120 described in reference to FIGS. 1-2 and the reaction surfaces 738, 838 described in reference to FIGS. 7-8. The airbag system 952 can operate in a manner similar to the airbag system 230 described in reference to FIGS. 2, 7, and 8. The safety system 942 is shown as including the seat system 948, the reaction system 950, and the airbag system 952, but one or more of these components may be absent from the safety system 942.

The controller 944 coordinates operation of the safety system 942 by communicating electronically (e.g., using wired or wireless communications) with the sensors 946, the seat system 948, the reaction system 950, and the airbag system 952. The controller 944 may receive information (e.g., signals, information, and/or data) from the sensors 946 and may receive information from and/or send information to other portions of the safety system 942 such as the seat system 948, the reaction system 950, the airbag system 952, or other portions (not shown).

The sensors 946 may capture or receive information related, for example, to components of the safety system 942 and from an external environment where the safety system 942 is located. The external environment can be an exterior of a vehicle or an interior of a vehicle such as the vehicle cabin 100 of FIGS. 1-2 and 7-8. Information captured or received by the sensors 946 can relate to seats, anchors, footrests, occupants within a vehicle, other vehicles, pedestrians and/or objects in the external environment, operating conditions of the vehicle, operating conditions or trajectories of other vehicles, and/or other conditions within the vehicle or exterior to the vehicle.

The safety system 942 can change an operational mode of the seat system 948, the reaction system 950, and/or the airbag system 952 based on a control signal, such as a signal from the controller 944. The control signal may be based on information captured or received by the sensors 946 and may cause various components within the safety system 942 to change between various operational modes.

Figure 10:
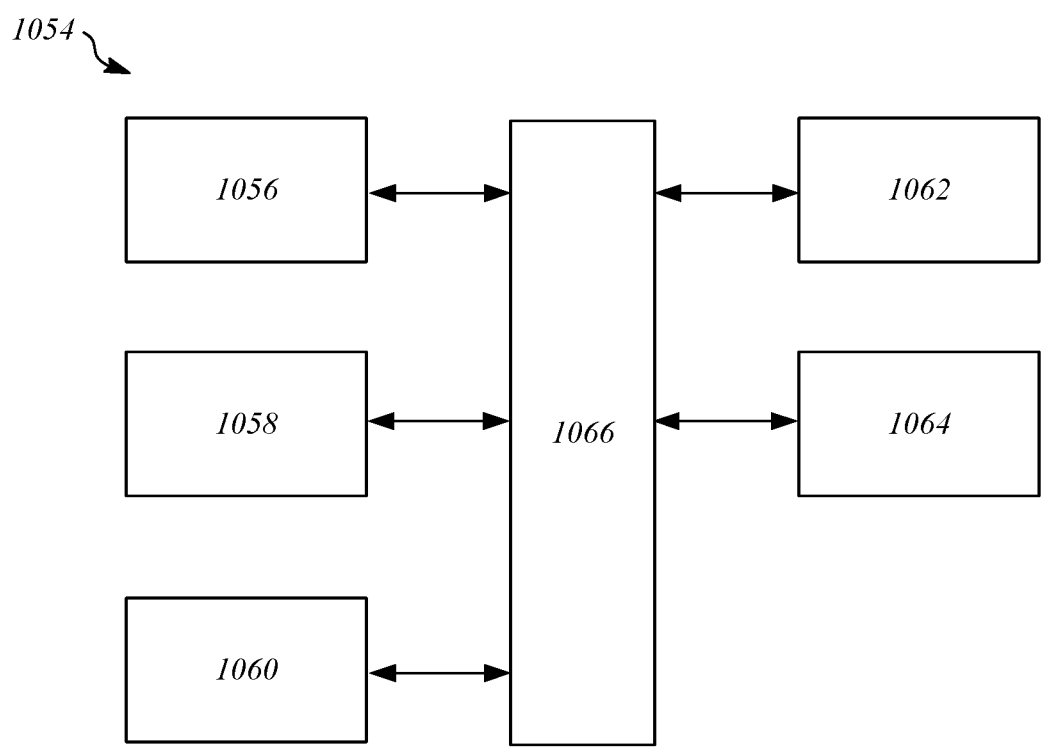
FIG. 10 is an illustration of a hardware configuration for a controller.

FIG. 10 shows an example of a hardware configuration for a controller 1054 that may be used to implement the controller 944 and/or other portions of the safety system 942. In the illustrated example, the controller 1054 includes a processor 1056, a memory device 1058, a storage device 1060, one or more input devices 1062, and one or more output devices 1064. These components may be interconnected by hardware such as a bus 1066 that allows communication between the components.

The processor 1056 may be a conventional device such as a central processing unit and is operable to execute computer program instructions and perform operations described by the computer program instructions. The memory device 1058 may be a volatile, high-speed, short-term information storage device such as a random-access memory module. The storage device 1060 may be a non-volatile information storage device such as a hard drive or a solid-state drive. The input devices 1062 may include sensors such as the sensors 946 and/or any type of human-machine interface, such as buttons, switches, a keyboard, a mouse, a touchscreen input device, a gestural input device, or an audio input device. The output devices 1064 may include any type of device operable to send commands associated with an operating mode or state or provide an indication to a user regarding an operating mode or state, such as a display screen, an interface for a safety system such as the safety system 942, or an audio output.

As described above, one aspect of the present technology is the gathering and use of data available from various sources, such as from the sensors 946 or user profiles, to improve the function of safety systems such as the safety system 942. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to deliver changes to operational modes of safety systems such as the safety system 942 to best match user preferences or profiles. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based safety systems, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in operational modes in safety systems can be implemented for a given user by inferring user preferences or user status based on non-personal information data, a bare minimum amount of personal information, other non-personal information available to the system, or publicly available information.

What is claimed is:

1. A safety system for a vehicle, comprising:
   a work table disposed in an extended position and movable to a reaction position and a stowed position;
   an airbag; and
   a controller that includes a processor configured to:
      receive information indicative of a vehicle event; and
      send a command to deploy the airbag based on the information indicative of the vehicle event,
   wherein when deployed, the airbag expands to abut a bottom surface of the work table and is configured to move the work table from the extended position to the reaction position such that the bottom surface of the work table in the reaction position serves as a reaction surface for the airbag.

2. The safety system of claim 1, wherein the processor is further configured to:
   receive information indicative of the work table disposed in the stowed position; and
   send a command to cause movement of the work table from the stowed position to the extended position based on the information indicative of the vehicle event.

3. The safety system of claim 1, further comprising a table release mechanism configured to prohibit movement of the work table in a locked configuration and allow movement of the work table in an unlocked configuration, wherein the processor is further configured to:
   send a command to the table release mechanism to move from the locked configuration to the unlocked configuration to allow movement of the work table between the extended position and the reaction position based on the information indicative of the vehicle event.

4. The safety system of claim 1, further comprising a seat system, wherein the processor is further configured to:
   receive information indicative of a rearward position for a seat in the seat system, wherein the seat has a forward position proximate to the work table and the rearward position spaced from the work table.

5. The safety system of claim 4, wherein the processor is further configured to:
   send a command to at least one of a seat release mechanism to move from a locked configuration to an unlocked configuration to allow movement of the seat or a seat motion-control device configured to cause movement of the seat from the rearward position to the forward position based on the information indicative of the vehicle event and the rearward position of the seat.

6. The safety system of claim 4, further comprising:
   a seat energy-absorbing (EA) device configured to control movement of the seat between the rearward and forward positions.

7. The safety system of claim 6, wherein the seat EA device comprises an EA element configured to deform above a predetermined load threshold to control movement of the seat between the rearward and forward positions.

8. The safety system of claim 7, wherein the EA element is a series of notch elements spaced along a longitudinal axis of a seat guide.

9. The safety system of claim 6, wherein the seat EA device comprises a cable coupled to the seat and configured to payout from a cable guide above a predetermined load threshold to control movement of the seat along a seat guide.

10. The safety system of claim 9, wherein the cable guide comprises a spool and torsion bar configured to control payout of the cable along the seat guide.

11. The safety system of claim 9, wherein the cable comprises a ductile strip and the cable guide comprises barriers configured to deform the ductile strip to control payout of the ductile strip along the seat guide.

12. A method, comprising:
   receiving information indicative of an imminent collision for a vehicle;
   determining that a work table in the vehicle is in an extended position, wherein the work table has a stowed position, the extended position, and a reaction position; and
   sending a command to deploy an airbag of the vehicle in response to receiving the information indicative of the imminent collision and determining that the work table is in the extended position,
   wherein the work table is configured to move from the extended position to the reaction position based on expansion of the airbag so that a bottom surface of the work table in the reaction position serves as a reaction surface for the airbag.

13. The method of claim 12, further comprising:
   determining that the work table is in the stowed position; and
   sending a command to cause movement of the work table from the stowed position to the extended position in response to determining that the work table is in the stowed position and in response to receiving the information indicative of the imminent collision.

14. The method of claim 12, further comprising:
   determining that a seat associated with the work table is in a rearward position, wherein the seat has a forward position proximate to the work table and the rearward position spaced from the work table; and
   sending a command to at least one of a seat release mechanism to move from a locked configuration to an unlocked configuration to allow movement of the seat or a seat motion-control device to cause movement of the seat from the rearward position to the forward position in response to determining that the seat is in the rearward position and that the work table is in the extended position.

15. The method of claim 14, further comprising:
sending a command to a seat energy-absorbing (EA) device to control movement of the seat between the rearward and forward positions.

16. A safety system for a vehicle, comprising:
a work table disposed in an extended position and movable to a reaction position and a stowed position;
a seat disposed in a rearward position spaced from the work table and movable to a forward position proximate to the work table;
an airbag disposed in a stowed position under the work table and expandable to a deployed position abutting a bottom surface of the work table; and
a controller that includes a processor configured to:
  send a command to deploy the airbag upon receiving information indicative of a vehicle event; and
  send a command to move the seat from the rearward position to the forward position upon receiving the information indicative of the vehicle event,
wherein the airbag is configured to move the work table from the extended position to the reaction position such that the bottom surface of the work table in the reaction position serves as a reaction surface for the airbag.

17. The safety system of claim 16, wherein the processor is further configured to:
send a command to a seat release mechanism to move from a locked configuration to an unlocked configuration to allow movement of the seat from the rearward position to the forward position.

18. The safety system of claim 16, wherein the processor is further configured to:
send a command to a seat motion-control device to cause movement of the seat from the rearward position to the forward position.

19. The safety system of claim 16, further comprising:
a seat energy-absorbing (EA) device configured to control movement of the seat between the rearward and forward positions.

20. The safety system of claim 19, wherein the seat EA device comprises an EA element configured to deform above a predetermined load threshold to control movement of the seat between the rearward and forward positions.

\* \* \* \* \*